Figure 1:
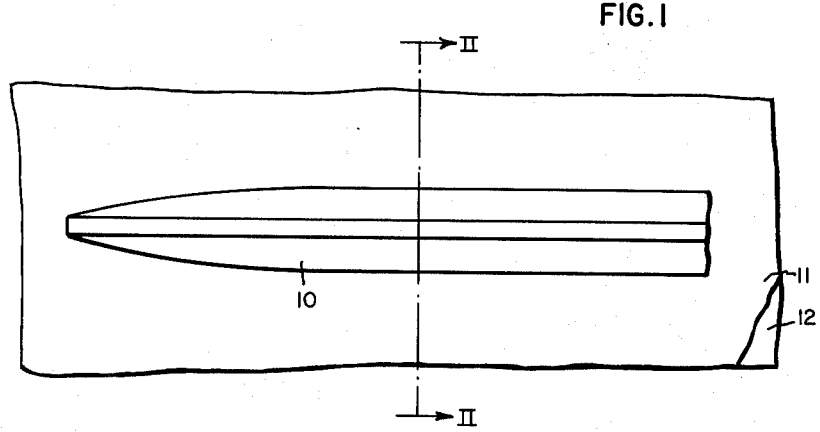

Aug. 17, 1965   W. G. RENSHAW ETAL   3,201,211
STAINLESS STEEL TRIM MEMBER
Filed June 22, 1962

3,201,211
STAINLESS STEEL TRIM MEMBER
William G. Renshaw, Natrona Heights, and Rush A. Lincoln, Pittsburgh, Pa., assignors to Allegheny Ludlum Steel Corporation, Brackenridge, Pa., a corporation of Pennsylvania
Filed June 22, 1962, Ser. No. 204,333
2 Claims. (Cl. 29—183.5)

This invention relates to improvements in stainless steel trim members and in particular to the protection of stainless steel automotive trim from contact or crevice corrosion.

Stainless steels provide a very excellent material for trim and decorative moldings for automotive uses, and provide outstanding resistance against weather, atmosphere and other types of corrosive elements in road service. Stainless steel also has a bright, lustrous and attractive surface, particularly stainless steel strip material with a No. 2 automotive strip finish which the automobile manufacturers form into trim and further buff and polish to enhance the bright and attractive metallic luster. No other metal used as automotive trim provides such a lasting attractive finish as stainless steel. Years after its application as such a trim it may be cleaned and restored to its original bright and lustrous appearance.

It has repeatedly been observed, however, that the areas of contact between the stainless trim and automotive body panels are subject to sporadic rusting attack. While this does not detract from the appearance of the stainless, it does show appreciable build-up of rust corrosion products at the edge of the molding. The corrosion products which form in this manner originate from corrosive attack of the carbon steel body panels rather than the stainless steels. There is evidence that the contact of stainless with carbon steel tends to accelerate the attack on the carbon steel because of galvanic potentials. The stainless steels, in their normal corrosion resistant condition, possess a noble or passive potential, while carbon steel has a highly active potential. The difference in potential that exists might be as high as approximately one-half volt. In the absence of contact with stainless steels, the rate of attack on the carbon steel would actually, therefore, be much less. Since it is highly desirable to use stainless steels for this type of application, some means to alleviate this harmful galvanic corrosion was found to be necessary.

The use of coatings or inert materials such as special paints or organic coatings as barrier layers between the stainless steel trim and the painted body panels serves to retard rust bleeding from the painted mild steel panels to some extent. However, such coatings are not a satisfactory answer to the rust bleeding problem since corrosion of the body panels eventually penetrates any such barrier in a similar manner to the penetration of the automobile paint. There is no practical barrier material for automotive application that would not contain some pores or pits to initiate corrosion from the automotive body. In forming or fabricating moldings or trim parts, considerable abrasion and scratching damage coatings of this type and thereby render them ineffective.

It has now been found that by the method and article of the present invention a stainless steel automobile trim member may be provided that exhibits the natural luster and beauty of stainless steel but which will not create red rust bleeding from the painted mild steel body panel of automobiles during the normal period of usefulness of the automobile. It has also been found that by the method of the present invention the corrosion resistance of stainless steel may be substantially enhanced.

It is accordingly, the object of the present invention to provide stainless steel automotive trim that will not cause red rust bleeding of the painted mild steel automobile panels to which it is attached.

It is also an object of the present invention to extend the life of automobile panels and trim by providing a sacrificial zinc coating to the surface of stainless steel trim that sacrificially corrodes in regard to the mild steel panels of the automobile to avoid red rust bleeding.

Figure 2:
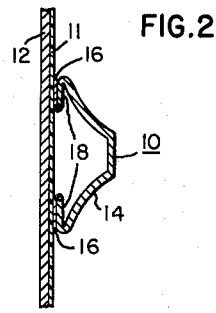

Other objects and advantageous features of the present invention will be obvious from the following description and drawing wherein:

FIGURE 1 is a view in side elevation of an automotive stainless steel trim member mounted on a section of a painted automobile mild steel panel, and FIG. 2 is a view in section and greatly enlarged taken along the line II—II of FIG. 1.

In general, the present invention is directed to a stainless steel automobile trim member formed with an automobile mild steel contacting surface that is coated with a thin coating of zinc (.01 to 1.0 gram per square foot of surface contacting area which in thickness is from about .0000006″ to about .00006″) and a bright and lustrous exposed surface having its microscopic pits and voids filled with zinc. The trim member of the present invention does not form a galvanic cell with the mild steel of the automobile panel so as to cause the panel to corrode and has an exposed surface that exhibits superior corrosion resistance to the prior known stainless steel automobile trim members. The present invention is also directed to the method of manufacturing such stainless steel automobile trim members wherein stainless steel strip is zinc plated or coated (.01 to 1 gram per square foot), then formed into automotive trim having an automobile contacting face and an exposed surface, and removing the appearance of the zinc coat or plate from the exposed surface by buffing while leaving the zinc plate or coat on the automobile contacting surface. A preferred embodiment of the present article and method is to apply the thin zinc coat or plate to a weight or thickness of from about .04 to .4 gram per square foot which corresponds to a thickness of from about .0000024″ to .000024″.

It has been discovered that while all visible signs of the zinc plate or coating have been buffed from the face of the trim, the resistance to corrosion of the buffed stainless steel surface has been enhanced. Consequently, the present invention also includes such a method for enhancing the corrosion resistance of stainless steel.

The use of zinc coatings as sacrificial corrosion coatings on mild steel and nonstainless grades of steel has been practiced for many years. By far the most common process for zinc coating is hot dip galvanizing. There are other methods such as sherardizing, metal spraying and electro deposits. However, since the prior art uses of galvanizing have been for the purpose of effecting selective or sacrificial corrosion of the zinc plate in preference to the metal which is coated, it has been necessary to effect relatively thick coatings of zinc amounting to about .75 to 2.50 oz. per square foot of surface area. The method and article of the present invention are contrasted to the methods and articles of the prior art, not only in that the base metal is a stainless steel member, which, under ordinary conditions would not be susceptible to corrosive attack in the manner of mild steel or low alloy steel, but also in the fact that in the present instance a thin zinc plate or coating is applied to a member for sacrificial corrosion with respect to a second member, namely the mild steel automotive panel. The present coating is not a galvanic type coating in respect to the prior art galvanic coatings in that it does not protect the article to which it is applied but avoids corrosion from occurring on an article to which that article is attached. The stainless steel is noble in respect to the mild steel panel but the mild steel panel is noble in respect to the zinc coating on the stainless steel. The thin zinc plating of the present invention retards or eliminates the rust bleeding of the mild steel. Should the zinc coating or plating be applied to the mild steel in the manner of the prior art, it would be necessary to effect a coating of a weight of .75 to 2.50 oz. per square foot.

The coating of the present invention may be applied in any conventional manner, but should be thin (no more than about one gram per square foot and preferably no more than about .4 gram per square foot) so that it may be easily and effectively buffed from at least that surface of the stainless steel that is normally visually exposed. In other words, the stainless steel strip is zinc coated and then is formed into the automotive trim and buffed in such a manner that the surface exposed to view will exhibit the natural bright and lustrous attractive stainless steel surface, whereas the surface of the trim that is abutted to and disposed in seating relation on the mild steel panels will be coated with the zinc coating. If the coat is permitted to be too thick, it may not be efficiently buffed from the surface of the stainless steel during the normal and subsequent buffing operation that follows forming. If the coating is too thin (less than about .01 gram per square foot of surface area), it will not offer lasting galvanic protection. Preferably the plate or coat should be at least .04 gram per square foot.

of the compositions of both baths employed are given below.

*Table I*

| Cyanide Zinc Plating Solution | Acid Zinc Plating Solution |
|---|---|
| Temperature Range 20-100° F. | Temperature range 130-150° F. ph 3.0-4.0 |
| Zinc Cyanide, g./l. — 60 | Zinc Sulfate, g./l. — 360 |
| Sodium Cyanide, g./l. — 30 | Sodium Sulfate, g./l. — 75 |
| Sodium Hydroxide, g./l. — 78 | Magnesium Sulfate, g./l. — 60 |
| Powdered Zinc, g./l. — 2.4 | |
| Activated Carbon, g./l. — 2.4 | |

It has been found that the use of reverse current prior to making the stainless parts cathodic for plating is beneficial in obtaining a tight, adherent zinc plating on the material. A typical group of operating conditions involving variations in current density and time for both the anodic and cathodic cycles is shown below in Table II, together with a description of the zinc deposit and its adherence to the stainless steel surface for each of these conditions. The zinc deposit weights, expressed in grams per square inch of surface, are shown also for some plating conditions. The plating conditions shown in Table II involve plating 2″ x 4″ samples (16 square inches) of AISI Type 430 stainless steel strip having a No. 2 (automotive) strip finish:

*Table II*

| Anodic Treatment | | Zinc Plating | | Cyanide Bath | | Acid (sulfate) Bath | |
|---|---|---|---|---|---|---|---|
| Current Density, amps/sq. in. | Time, secs. | Current Density, amps/sq. in. | Time, secs. | Appearance [1] | Coat. Wt., Grams/Sq. Ft. | Appearance [2] | Coat. Wt., Grams/Sq. Ft. |
| .31 | 10 | .031 | 15 | Invisible coating | .0072 | Thin uniform loose coating. | [3] .04464 |
| .31 | 10 | .031 | 30 | ___do___ | .0072 | Med. uniform loose coating. | .04464 |
| .31 | 10 | .031 | 45 | ___do___ | .0072 | ___do___ | .04464 |
| .31 | 10 | .062 | 15 | ___do___ | .0072 | Med. uniform tight coating. | .04464 |
| .31 | 10 | .062 | 30 | ___do___ | .0072 | ___do___ | .04464 |
| .31 | 10 | .062 | 45 | (Lt. coat. near bot. edge) invisible coating. | .0072 | Med. heavy uniform tight coating. | .04464 |
| .31 | 10 | .125 | 15 | Very thin coat., loose | .0072 | Med. uniform tight coatings. | .04464 |
| | | | | All samples below blistered at edge | | | |
| .31 | 10 | .125 | 30 | Thin coating, loose | .0288 | Med. heavy uniform tight coating. | [4] .1584 |
| .31 | 10 | .125 | 45 | ___do___ | .0288 | Heavy uniform tight coating. | .1584 |
| | | | | | | Difference in coating at edge on all samples below | |
| .31 | 10 | .188 | 15 | ___do___ | .0288 | Heavy coating-tight | .1584 |
| .31 | 10 | .188 | 30 | ___do___ | [5] .06336 | ___do___ | .1584 |
| .31 | 10 | .188 | 45 | Med. coating, loose | .06336 | ___do___ | .1584 |
| .31 | 10 | .25 | 15 | ___do___ | .06336 | ___do___ | .1584 |
| .31 | 10 | .25 | 30 | ___do___ | .06336 | ___do___ | .1584 |
| .31 | 10 | .25 | 45 | ___do___ | .06336 | ___do___ | .1584 |

[1] Although the cyanide baths provided zinc plates or coatings described generally as being loose, such coatings proved to be adequately tenacious to withstand drawing into automotive trim and adequately protected mild steel automotive panels to which the trim was attached. The coatings described as invisible did not noticeably protect automotive panels or afford corrosion protection to the plated and buffed stainless steel surface.
[2] The acid baths provided superior and more tenacious plates than the cyanide baths.
[3] Approximately .0000026″ thick.
[4] Approximately .000010″ thick.
[5] Approximately .0000035″ thick.

To obtain a substantially continuous coating and yet a coating of the thickness desired, it is preferable to obtain the coating by means of electro deposition. Electro deposition may be accomplished by prior known baths consisting of aqueous solutions containing an electrolyte and zinc. We have employed two different plating baths, both of which are presently used in the metals industry for plating low alloy or carbon steels. Our investigations have indicated that stainless steels may be plated easily by either of these methods, and descriptions While the tightness or degree of adherence of the zinc coat or electroplate to the surface of the stainless steel is not critical insofar as its sacrificial corrosion function is concerned, such coatings or plates must be sufficiently tenacious to withstand handling and forming operations. Accordingly, it has been found to be desirable to clean and activate the surface of the stainless steel prior to electroplating by first subjecting the strip to a hot alkaline cleaner and then immersing the strip in hot sulfuric acid in a manner such as or similar to that set forth by the American Society for Testing and Materials (ASTM Standards, 1961, ASTM Designation: B 254–53, Part 2, "Recommended Practice for Preparation of and Electroplating on Stainless Steel" commencing on page 1136). Stainless steel strip which has just been pickled or bright annealed does not require alkaline cleaning prior to activation. The stainless steel should be removed from the sulfuric acid bath immediately upon detection of hydrogen evolution rather than allowing it to remain in the solution for a minimum of one minute after such evolution commences, as taught in the afore-mentioned ASTM specifications. This results in a tight, adhering coating of zinc over the surface of the stainless steel without detracting from the bright anneal surface finish thereof. If the stainless steel is not removed from the activating acid bath promptly, its bright and lustrous surface becomes dull and thus, even though the zinc coating is tightly adherent thereto, the resulting coated steel is not suitable from the appearance viewpoint for automobile trim applications.

FIGS. 1 and 2 of the accompanying drawing show a typical stainless steel trim member 10 that has been manufactured in accordance with the method of the present invention and which is mounted as by means of clips (not shown) on the painted surface 11 of an automobile panel 12 of carbon steel. The surface 14 of the trim member which is an exposure surface exposed to view on the automobile exhibits a bright and lustrous attractive stainless steel finish which has been buffed after forming to remove the extremely thin zinc plate therefrom as well as any scratches or imperfections caused by drawing (of which there are practically none when the zinc plate is used. The zinc plate remaining is represented at 16 (see FIG. 2) on the automobile panel contacting flanges of the trim 10, it being noted that such zinc plating has been removed from the visibly exposed portions of the trim member 10. Normal corrosion or crevice corrosion would occur in the contact area between the flanges 18 and the painted panel 12; however, in accordance with this invention a sacrificial layer of zinc 16 is provided with the result that little or no corrosion will occur at such contact area and that which does occur will not be offensive red dust bleeding usually experienced, but will be a slight milky white type of corrosion product which is easily and effectively removed by any of the conventional automobile cleaning methods. For the purpose of the present specification, flanges 18 constitute the automotive panel contacting "face" or attachment face of the trim member 10.

It has been established as a result of the various tests conducted with AISI Type 430, 201 and 301 stainless steels that very tight zinc deposits may be formed which can be satisfactorily retained on the surfaces of the stainless steel during mild fabrications operations such as the forming of automotive trim. While it is possible that during such forming operations bits of the zinc deposit might be scratched off or destroyed during fabrication, a protective sacrificial corrosion effect still exists because of the sacrificial nature of the zinc plating. This is a distinct advantage as contrasted to the inert coatings heretofore mentioned. To illustrate the advantage of the application of extremely thin zinc plates in protecting against accelerated galvanic corrosion of carbon steel panels abutted to stainless steel, a number of experiments were conducted. In one instance, zinc coated stainless steel specimens were placed in close contact with a painted but scratched mild steel panel. The scratches were placed on this panel artificially to insure exposure of bare carbon steel. This assembly was then immersed in a corrosive solution frequently used in accelerated laboratory evaluation of automotive trim known as the slag-salt mixture. The slag-salt mixture consists of .5 gram of sodium sulfate, .25 gram of sodium sulfite, .1 gram of sodium thiosulfate, 52.5 grams of sodium chloride and 52.5 grams of calcium chloride dissolved in 1050 ml. of distilled water. The pH must be between about 8–9.5.

Test samples are immersed in the solution for one second at room temperature, then removed and dried for 100 seconds before a 250-watt heat lamp placed six inches away. The dried sample is re-immersed and this test cycle continued. After two weeks' exposure under these conditions, no rust had developed at the scratches on the carbon steel panel. In contrast, a similar assembly of unplated stainless steel and a painted but scratched mild steel panel was tested under the same conditions with a resulting heavy rust bleeding in eight hours.

Exterior exposure in the atmosphere of similarly constructed stainless steel on mild steel structures which were intermittently sprayed with the same solution again showed the same advantages for the zinc plated assemblies over the unplated assemblies in one week's exposure time.

The explanation of this protective effect is, of course, the fact that zinc is sacrificially being corroded, and at the same time the carbon steel attack is actually being lessened under these circumstances.

To illustrate further that even small breaks or deficiencies in the zinc coating at the areas of contact with painted body panels do not detract from its beneficial effect, it is pointed out that the specimens exposed to exterior atmospheric conditions, and also to an additional accelerated laboratory test, were prepared by bending or forming specimens into fairly sharp-cornered specimens of stainless steel after they had been plated (a zinc plate of approximately .0000026" thick, .045 gm./sq. ft. This type of operation would normally tend to loosen the surface electro deposits or plates. The bent areas of the stainless steel samples were the ones abutted to the mild steel panels. However, the results of these tests indicated that even though small amounts of the plating were removed, the benefit of the protection still existed.

In the further course of our investigation it was determined that the zinc plated articles could be buffed to remove zinc plate and produce the high luster finish conventionally used in automotive trim. Normally, under the circumstances, it would be expected that the surface would then perform as a buffed, unplated stainless steel. However, the results of laboratory corrosion tests in such environments as salt spray and the slag-salt accelerated test indicate that there is an improvement in corrosion resistance of the main surface of the buffed stainless steel so treated, in contrast to those surfaces which were not plated before buffing. The polishing, as by buffing as described, effects a redistribution of the zinc coating to effectively fill the pits and voids normally present in the surface of stainless steel sheet or strip. Such pits and voids normally nucleate corrosion when the surface of the stainless steel is exposed to a corrosive environment; however, when filled with zinc in the manner of the present invention it has been found that corrosion pitting normally nucleated by such pits and voids does not occur.

Buffing or polishing as used in conjunction with the present invention is intended to mean the well-known practice of applying a rotating wheel of cloth (usually cotton) to the stainless steel surface. Normally buffing compounds such as wax or soap plus a very fine particulate material are employed in conjunction with stainless steel buffing. The zinc plate is removed by the buffing but, as stated above, residual, but invisible, zinc metal remains in the pits and voids of the stainless steel. Normally materials with a rougher surface than about a No. 4 sheet finish are not buffed because such dull finishes cannot be brightened in this manner.

The salt spray test is found to produce rapid rusting of the surface of a standard stainless steel Type 434 (AISI Type 430 plus about .50% molybdenum) that exhibited a No. 2 automotive strip finish at 24 hours' exposure. This test consists of subjecting panels of the strip to an aqueous spray coating about 20%, by weight, NaCl at room temperature. A .0000026" thick zinc plated Type 434 specimen plated in accordance with the acid zinc plating solution in Table I and buffed so as to restore the bright and lustrous metallic finish showed no evidence of attack in 29 hours. In another instance, a different Type 434 specimen was tested in the unplated condition and also in the plated plus buffed condition. Once again, after 64 hours there was rusting of the unplated material and no rusting of the zinc plated plus buffed specimens.

In the salt slag dip test it has been found in general that Type 434, as well as Type 430, tends to break down in somewhat less then eight hours exposure time. Again, we illustrate by corrosion tests summarized in Table III below that zinc plated plus buffed specimens show an outstanding improvement over specimens which have not been so treated.

*Table III*

| Type | Anodic Time, sec. | Cathodic Time, sec. | Current Density, amp/in.² | Treatment Before Test | Slag-Salt Test Result |
|---|---|---|---|---|---|
| 434 | (²) | (²) | (²) | Degreased only | Failed, 4 hrs. |
| 434 | (²) | (²) | (²) | Buffed and degreased ¹ | Do. |
| 434 | ³ 15 | ³ 15 | .125 | No buff, degreased ¹ | Failed, 5 hrs. |
| 434 | ³ 15 | ³ 15 | .125 | Buffed and degreased ¹ | Passed, 8 hrs. |
| 434 | ³ 10 | ³ 45 | .125 | do | Do. |

¹ Buffed both sides sufficiently to remove all appearances of the zinc plate.
² Control samples not plated.
³ Exposed to the acid zinc plating solution of Table I.

Hence it is shown above that a thin (about .045 gram/sq. ft.) zinc plate placed on stainless steel automotive trim which is abutted to a painted mild steel panel such as an automobile panel, offers unusual sacrificial corrosion properties and prevents corrosion of the mild steel panels and the corrosive products thereof from reaching the stainless steel to discolor or cause rust bleeding of the stainless steel. It is also apparent from the above that a thin electro deposited zinc plate on stainless steel may be applied to the stainless steel strip prior to drawing into automotive trim, and additionally it is shown that after forming, sufficient zinc plate will remain on the trim where it normally abuts the mild steel panels to effect a sacrificial corrosion to avoid rust bleeding in the crevice corrosion in the vicinity of where the stainless steel abuts the mild steel painted panels. Also, it is shown that the zinc plates may be readily buffed from the surface of the stainless steel trim that is exposed to view so as to restore the attractive lustrous finish so desired on automotive trim, and additionally provide improved corrosion resistance to the resultant stainless steel surface. Hence, it is quite apparent from the given data that the corrosion resistance of stainless steel surfaces in general may be enhanced by the electro deposition of zinc on the surface thereof and the removal of such zinc by buffing.

Corrosion tests were also conducted and are being conducted under actual service conditions wherein automotive trim was fabricated from stainless steel strip (Type 434, AISI Type 430 plus .50% Mo) which had been zinc plated with a .045 gram/sq. ft. plate in the solution of Table I entitled "Acid Zinc Plating Solution." The exposed portion of the trim members was buffed to restore the bright and lustrous No. 2 automotive finish and to remove any imperfections which may have occurred during forming, while the zinc plate was allowed to remain on that portion of the trim abutted against the painted mild steel panel of test automobiles. The test automobiles are being tested under normal driving conditions of a particularly corrosive area within the United States. These experimental automobiles have shown no significant corrosion to date, and these tests continue.

Coils of Type 430 and Type 434 (3″ wide, approximately .024″ ga.) were continuously plated with zinc employing the acid bath of Table I to effect a continuous zinc coat approximately .0000026″ thick (about .045 gram/sq. ft.) on the surface thereof. Samples of these zinc plated materials were stamped, buffed and roll-formed into automotive trim materials such as are illustrated in FIGS. 1 and 2. The moldings are standard 1962 automotive stainless steel trim parts. Coils of Type 434 that had not been zinc coated were also processed in a similar manner with the same equipment at the same time.

Results of this fabrication experiment showed a definite lubricating effect of the zinc plate in the roll form and stamping operations. For example, roll pressures and settings had to be reduced for zinc plated material because the lubricating effect caused much easier forming than on regular unplated material. Similarly, in the stamping operation where ends of the trim were closed, it was noted that zinc avoided a scratch or score mark on a certain high point of the die, whereas the unplated coil showed a definite blemish in this respect on every part made. The protective lubricating effect of the extremely thin zinc plate offered easier forming and also avoided the scratch or scoring encountered from the dies.

Buffing of the zinc plated parts after forming was no different from that of the unplated parts.

The method and articles of the present invention are particularly significant when applied to those stainless steel grades ordinarily employed in the manufacture of automotive trim parts. For example, these materials are commonly fabricated from AISI Type 430 stainless steel or modifications of this grade such as the Type 434 material which consists of AISI Type 430 plus small additions of Mo (about 1.0%). The invention is equally significant when employed in conjunction with AISI Types 301 and 201 stainless steels which are also commonly used for these applications. It is, of course, understood that the method and article of the present invention are equally applicable to any of the stainless steel grades which may be employed as trim material abutting against a mild steel panel. In the embodiment of the invention the corrosion resistance properties of the surface of the stainless steel are significantly enhanced by being first zinc coated and then buffed, and apply to all stainless steel grades regardless of their specific application. For instance, the method and article of the present invention encompass all stainless steel grades which contain from about 10 to 30% Cr plus either residual Ni as exists in the nominally ferritic and martensitic grades to the grades containing small nickel contents as in some of the hardenable grades of the non-austenitic stainless steels and including austenitic grades containing up to 30% nickel. The invention encompasses such stainless steel grades containing from 10 to 30% chromium, although they may contain residual or small purposeful additions of such materials as Mo, V, Ti, Cb, W, B, N and Se.

We claim:
1. A stainless steel trim member for use with a panel structure made of metal that is less noble in the electromotive series than the stainless steel, said stainless steel member having an attachment face and an exposure face, said attachment face being disposed to abut said panel member when in assembled relationship therewith, and a coating of zinc on said attachment face, said coating having a thickness between the ranges of .0000006″ to .00006″ whereby the coating on the trim member when in assembled relationship will tend to retard and prevent galvanic action between the panel structure and the trim member so that discoloring oxidized products formed by any galvanic action are retarded.

2. A stainless steel trim member for use with a panel structure made of metal that is less noble in the electromotive series than the stainless steel, said stainless steel member having an attachment face and an exposure face, said attachment face being disposed to abut said panel member when in assembled relationship therewith, and a coating of zinc on the attachment face, said coating having a thickness between the ranges of .0000024″ to .000024″ whereby the coating on the trim member when in assembled relationship will tend to retard and prevent galvanic action between the panel structure and the trim member so that discoloring oxidized products formed by any galvanic action are retarded.

References Cited by the Examiner

UNITED STATES PATENTS

| | | | |
|---|---|---|---|
| 1,268,987 | 6/18 | McMullen | 29—196.5 |
| 1,972,835 | 9/34 | Tainton | 204—55 X |
| 2,192,901 | 3/40 | Elder | 29—196.5 |
| 2,231,967 | 2/41 | Tainton | 29—196.5 |
| 2,294,750 | 9/42 | Harris | 29—196.5 |
| 2,348,658 | 9/44 | Slaughter | 20—74 |
| 2,471,247 | 5/49 | Stadler | 189—88 |
| 2,500,377 | 3/50 | Poupitch | 189—88 |
| 2,547,947 | 4/51 | Kleis | 29—1965 X |
| 2,906,018 | 9/59 | Baker | 29—528 |
| 2,951,768 | 9/60 | Brash | 117—130 X |
| 2,968,092 | 1/61 | Ohtake | 29—528 |
| 2,991,205 | 7/61 | Lincoln | 148—6.2 |
| 3,090,118 | 5/63 | Hanzel | 29—199 X |
| 3,138,834 | 6/64 | Shanok | 20—74 |

HYLAND BIZOT, *Primary Examiner.*

DAVID L. RECK, *Examiner.*